United States Patent [19]
Topham

[11] Patent Number: 5,249,074
[45] Date of Patent: Sep. 28, 1993

[54] BIPOLAR JUNCTION TRANSISTOR COMBINED WITH AN OPTICAL MODULATOR

[75] Inventor: Peter J. Topham, Northampton, United Kingdom

[73] Assignee: GEC-Marconi Limited, Stanmore, England

[21] Appl. No.: 835,475
[22] PCT Filed: Jul. 1, 1991
[86] PCT No.: PCT/GB91/01065
  § 371 Date: Feb. 26, 1992
  § 102(e) Date: Feb. 26, 1992
[87] PCT Pub. No.: WO92/00543
  PCT Pub. Date: Jan. 9, 1992

[30] Foreign Application Priority Data
Jun. 29, 1990 [GB] United Kingdom ............... 9014505

[51] Int. Cl.[5] ................................................ G02F 1/015
[52] U.S. Cl. ................................................ 359/248
[58] Field of Search ............... 359/248, 245; 385/1, 385/2, 4

[56] References Cited

U.S. PATENT DOCUMENTS

4,872,744 10/1989 Abeles et al. ...................... 359/276
4,997,246  3/1991 May et al. ......................... 385/2

FOREIGN PATENT DOCUMENTS

0155802  9/1985 European Pat. Off. .
0249645 12/1987 European Pat. Off. .
0260988  3/1988 European Pat. Off. .
2221053  1/1990 United Kingdom .

OTHER PUBLICATIONS

Electronic Letters, vol. 25, No. 7, Mar. 30, 1989, W. Q. Li et al, "Integrated multi-quantum-well controller-modulator with high gain for low-power photonic switching", pp. 476–477.

IEEE Photonics/Technology Letters, vol. 1, No. 3, Mar. 1989, New York, "Field-effect transistor self-electrooptic effect device: integrated photodiode, quantum well modulator and transistor", D. A. B. Miller et al., pp. 62–64.

Okada et al., "Optical Intensity Modulator for Integrated Optics by use of a Leterojunction bipolar transistor waveguide structure," Appl. Phys. Lett., vol. 55, #25, Dec. 18, 1989.

Primary Examiner—Ian J. Lobo
Attorney, Agent, or Firm—Kirschstein, Ottinger, Israel & Schiffmiller

[57] ABSTRACT

A combined bipolar junction transistor and an optical modulator comprising a plurality of semiconductor layers providing an optical mirror for the modulator, a collector for the transistor formed upon the plurality of semiconductor layers, the collector also forming an optical absorber of the modulator, a base of the transistor formed upon the collector, an emitter of the transistor formed upon the base and a metallic contact for the base, the metallic contact providing a function of an optical reflector for the modulator.

8 Claims, 1 Drawing Sheet

BIPOLAR JUNCTION TRANSISTOR COMBINED WITH AN OPTICAL MODULATOR

BACKGROUND OF THE INVENTION

1. Field of the Invention

This invention relates to a combined bipolar junction transistor and ah optical modulator.

This invention addresses the need for optical modulators driven by the low voltage swings available from silicon digital integrated circuits. This is achieved by combining the functions of a resonant-optical absorption modulator with a bipolar junction transistor. Applications include optical interconnection of integrated circuits.

DESCRIPTION OF RELATED ART

Existing electro-optical absorption modulators require high driving voltages to achieve useful changes in transmission or reflection. These high drive voltages are not available from silicon large scale integrated circuits—requiring the use of buffer amplifiers, adding to complexity and power consumption. Existing approaches (W.Q.Li et.al. Elec. Lett. 25, (1989,476–477) to the integration of a modulator and a transistor have not provided voltage gain, nor has advantage been taken of optical resonance to reduce the voltage swing required on the modulator.

SUMMARY OF THE INVENTION

According to the invention there is provided a combined bipolar junction transistor and an optical modulator comprising a plurality of semiconductor layers providing an optical mirror for said modulator, a collector for said transistor formed upon said plurality of semiconductor layers, said collector also forming an optical absorber of said adulator, a base of said transistor formed upon said collector, an emitter of said transistor formed upon said base and a metallic contact for said base, said metallic contact providing a function of an optical reflector for said modulator.

Preferably the collector layer is formed from a plurality of semiconductor layers. A part of the base metallic contact may be replaced by another reflective material. Further, a part of the base contact may be removed to allow transmission of light. The semiconductor layers are preferably made of elements in chemical groups III and V. The preferred alloys for the semiconductor layers are: GaAs, GaAlAs, GaInAs, GaInAsP, AlInAs and GaAlInAs. Preferably the device is made on a substrate of GaAs, InP or Silicon.

The advantages of this invention are the provision of a transistor giving voltage gain together with optical folding (that is, resonance) of the modulator which reduces the voltage swing required for a given change in optical transmission or reflection. The transistors can also be used as the basis for electronic circuits to act as drivers for the modulators or as receiver amplifiers when using the modulators as light detectors. The transistors can also make logic circuits for coding or decoding the data to be transmitted or received.

BRIEF DESCRIPTION OF THE DRAWINGS

The invention will now be described further by way of example with reference to the accompanying drawings in which.

DETAILED DESCRIPTION OF THE PREFERRED EMBODIMENT

Figure 1:
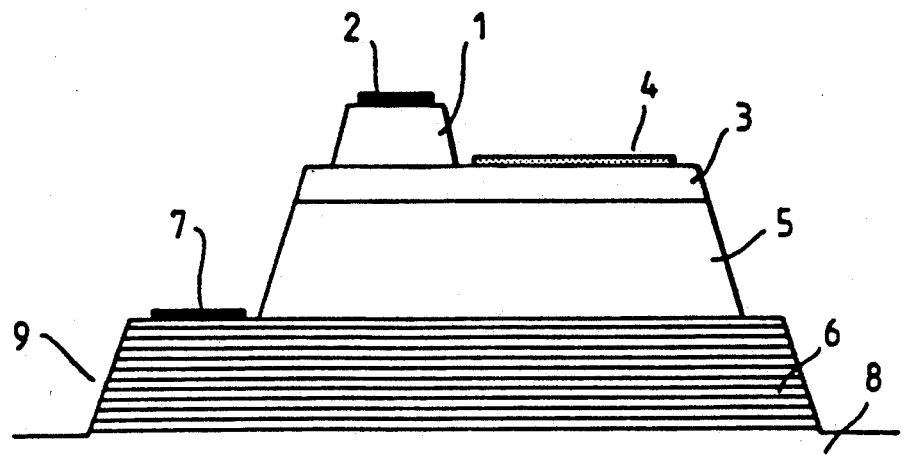
FIG. 1 illustrates the cross section of the device according to the invention.

In the cross-section shown in FIG. 1 the transistor optical modulator comprises a semiconductor layer (1) which forms the emitter of a bipolar junction transistor. The said emitter can be n-type or p-type. A contact (2) is deposited on the emitter layer. The said emitter is formed upon a base layer (3) which is of the opposite doping type to the emitter layer and said base layer can be of the same or different semiconductor alloy as the emitter. A metallic contact (4) is deposited onto the base layer. The said base layer is formed upon a semiconductor layer (5) which is of opposite type to the base and so forms the collector of a BJT. Said collector can be of the same or different alloys as the base or emitter. The collector layer also functions as the absorptive medium for an electro-optical modulator. Said collector layer is formed upon a plurality of semiconductor layers (6), of the same doping type as the collector, which are so arranged as to form an optical mirror. Said mirror can be formed from one or more semiconductor alloy compositions. A contact (7) is deposited onto the mirror and forms the contact to the collector of the transistor. Said mirror is formed upon a semiconductor substrate (8) which can be of any doping type and the sane or different semiconductor material as any of the layers in the device. The devices can be isolated from one another by removing the mirror layer around the device (9).

The operation of the bipolar junction transistor is performed by the emitter layer (1), the base layer (3), and the collector layer (5), in which the base layer is of the opposite doping type to the emitter and collector layers. If one or more layers are of different alloy composition then a heterojunction bipolar transistor is formed.

The modulator is formed from the reflector layer (4) the absorber layer (5) and the mirror layers (6). By arranging that the reflector and mirror form a resonant cavity the optical path is folded which improves the modulaton depth available from this type of modulator. The absorber layer (5) also serves as the transistor collector layer.

Figure 2:
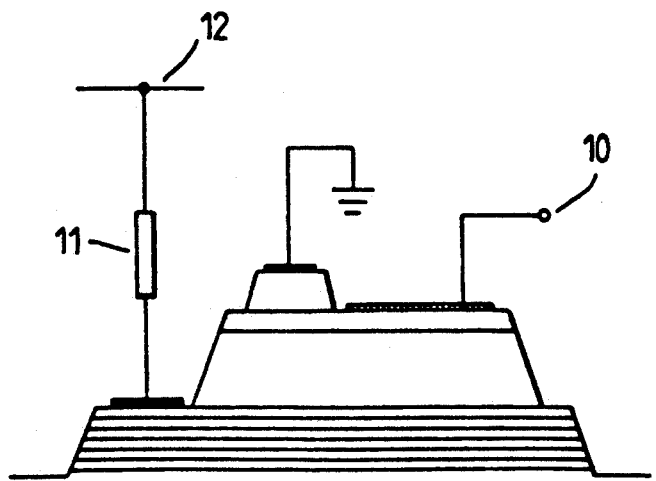
FIG. 2 illustrates an exemplary circuit of the device embodying the invention.

In the exemplary circuit shown in FIG. 2 the emitter contact (2) is grounded and an input voltage (10) applied to the base contact (4). A load resistor (11) is connected between the collector contact (7) and a supply voltage (12). When the input is grounded, no collector current flows and so the supply voltage appears across the absorption layer of the modulator. The optical signal to be modulated enters through the substrate (8) and is reflected off the base contact (4). When a small voltage of appropriate polarity is applied to the input a collector current flows, dropping voltage across the load resistor. This voltage drop can be arranged to be many times larger than the input voltage (so providing amplification). A reduced voltage (supply less the voltage drop) is thus applied to the modulator, changing its absorption. An alternative optical configuration is to leave a hole in the base contact (4) to allow light to pass through the modulator.

I claim:

1. A combined bipolar junction transistor and an optical modulator comprising a plurality of semiconductor layers providing an optical mirror for said modulator, a collector for said transistor formed upon said plurality of semiconductor layers, said collector also forming an optical absorber of said modulator, a base of said transistor formed upon said collector, an emitter of said transistor formed upon said base and a metallic contact for said base, said metallic contact providing a function of an optical reflector for said modulator, said optical mirror and said metallic contact/optical reflector forming a resonant cavity therebetween so that light entering normal to said semiconductor layers is repeatedly reflected between said optical mirror and said metallic contact/optical reflector along a folded optical path and is repeatedly absorbed by said collector/optical absorber, thereby allowing the light to be modulated by application of an electric field across said collector/optical absorber.

2. A combined bipolar junction transistor and an optical modulator as claimed in claim 1, in which the collector is formed from a plurality of semiconductor layers.

3. A combined bipolar junction transistor and an optical modulator as claimed in claim 1, in which a part of the base metallic contact is replaced by another reflective material.

4. A combined bipolar junction transistor and an optical modulator as claimed in claim 1, in which a portion of the base contact is removed to allow transmission of light.

5. A combined bipolar junction transistor and an optical modulator as claimed in claim 1, in which the semiconductor layers are made up from elements in chemical groups III and V.

6. A combined bipolar junction transistor and an optical modulator as claimed in claim 2, in which the semiconductor layers are formed from an alloy selected from the group consisting of GaAs, GaAlAs, GaInAs, GaInAsP, AiInAs, GaAlInAs.

7. A combined bipolar junction transistor and an optical modulator as claimed in claim 1, which is formed upon a substrate selected from the group of GaAs, In and silicon.

8. An integrated bipolar junction transistor and an optical modulator, comprising:
(a) a substrate;
(b) an optical mirror for the modulator, said optical mirror including a plurality of semiconductor layers on the substrate;
(c) a combined element on the optical mirror, and serving as both an optical absorber for the modulator and as a collector for the transistor;
(d) a collector contact in electrical communication with the collector;
(e) a base for the transistor, said base being located on the collector;
(f) an emitter for the transistor, said emitter being located on the base;
(g) an emitter contact in electrical communication with the emitter; and
(h) a base contact in electrical communication with the base, said base contact being constituted of a reflective material and serving as an optical reflector for the modulator, said optical reflector and said optical mirror being spaced apart with said optical absorber therebetween and forming a resonant cavity in which light entering the cavity is reflected between said optical reflector and said optical mirror along a folded optical path for repeated absorption by the optical absorber.

* * * * *